United States Patent
Dittmer et al.

(10) Patent No.: US 8,729,864 B2
(45) Date of Patent: May 20, 2014

(54) METHOD AND DEVICE FOR LIMITING THE STARTING CURRENT AND FOR DISCHARGING THE DC VOLTAGE INTERMEDIATE CIRCUIT

(75) Inventors: Bernd Dittmer, Ludwigsburg (DE); Arnold Winter, Filderstadt (DE); Dragan Mikulec, Vienna (AT)

(73) Assignee: Robert Bosch GmbH, Stuttgart (DE)

( * ) Notice: Subject to any disclaimer, the term of this patent is extended or adjusted under 35 U.S.C. 154(b) by 896 days.

(21) Appl. No.: 12/681,328

(22) PCT Filed: Sep. 26, 2008

(86) PCT No.: PCT/EP2008/062886
§ 371 (c)(1),
(2), (4) Date: Sep. 15, 2010

(87) PCT Pub. No.: WO2009/047129
PCT Pub. Date: Apr. 16, 2009

(65) Prior Publication Data
US 2011/0006726 A1   Jan. 13, 2011

(30) Foreign Application Priority Data
Oct. 5, 2007   (DE) .......................... 10 2007 047 713

(51) Int. Cl.
*H02J 7/00* (2006.01)

(52) U.S. Cl.
USPC ............ 320/134; 320/128; 320/136; 320/166

(58) Field of Classification Search
CPC .................................................... H02J 7/0031
USPC ........................................................ 320/134
See application file for complete search history.

(56) References Cited

U.S. PATENT DOCUMENTS

| | | | |
|---|---|---|---|
| 5,816,358 A | 10/1998 | Adler et al. | |
| 2004/0145338 A1* | 7/2004 | Nakamura et al. | 318/801 |
| 2004/0160792 A1* | 8/2004 | Youm et al. | 363/37 |

FOREIGN PATENT DOCUMENTS

| | | |
|---|---|---|
| CN | 1551476 | 12/2004 |
| DE | 278453 | 5/1990 |
| DE | 4323604 | 1/1995 |
| DE | 102004057693 | 6/2006 |
| JP | 2006-246569 | 9/2006 |

OTHER PUBLICATIONS

International Search Report, PCT International Patent Application No. PCT/EP2008/062886, dated Dec. 12, 2008.

* cited by examiner

*Primary Examiner* — Edward Tso
*Assistant Examiner* — Ahmed Omar
(74) *Attorney, Agent, or Firm* — Kenyon & Kenyon LLP

(57) ABSTRACT

Methods and associated devices are described for discharging the high-voltage network, particularly a DC voltage intermediate circuit, in which for discharging the capacitors of the high-voltage network, switching devices are used that lie between the capacitors and at least one precharging resistor and a high-voltage battery, and the switching devices are switches having a specifiable positioning of the switching contacts or switching units or relays or contactors, which are switchable with the aid of a control device. The operation of the switching units takes place in such a way that the at least one precharging resistor is used simultaneously for charging and discharging the DC voltage intermediate circuit.

23 Claims, 3 Drawing Sheets

METHOD AND DEVICE FOR LIMITING THE STARTING CURRENT AND FOR DISCHARGING THE DC VOLTAGE INTERMEDIATE CIRCUIT

FIELD OF THE INVENTION

The present invention relates to a method and devices for discharging the high-voltage network, especially in a hybrid vehicle or an electric highway vehicle.

BACKGROUND INFORMATION

In a hybrid vehicle and an electric highway vehicle voltages are used that are greater than 60 V DC. These voltages are designated as being high voltage in the vehicle, and they are the cause of dangerous leakage currents. The high voltage network, also called DC voltage intermediate circuit, in a hybrid vehicle and an electric highway vehicle, in the simplest case is made up of a battery, a voltage inverter having a DC voltage intermediate circuit capacitor, and one or more electric machines, additional high voltage consumers such as an electric climate control compressor and a cable harness which connects all the high voltage components to one another. The voltage inverter requires a DC voltage intermediate circuit capacitor for its functioning, having a sufficiently great capacitance. When switching the high voltage battery into the high voltage network, to which the DC voltage intermediate circuit capacitor is also connected, in order to avoid a short circuit current or an overcurrent, the DC voltage intermediate circuit capacitor is charged via a precharging resistor, which is usually located in the battery. After the expiration of the precharging time for the DC voltage intermediate circuit, the actual main contactor is closed and the precharging resistor is bridged. After the switching off of the high-voltage system, for instance, by disconnecting the high-voltage battery from the high-voltage network, all capacitors that are connected to the DC voltage intermediate circuit have to be discharged. For this purpose, a separate discharge circuit is normally used—in the simplest case an ohmic discharge resistor, which is permanently connected in parallel to the intermediate circuit capacitor.

An apparatus for the rapid discharge if an intermediate circuit capacitor, that is at a higher voltage, is described in German Patent Application No. DE 10 2004 057 693 A1. In this design approach, a DC voltage converter is used, in which the low-voltage-side voltage is increased so as to decrease the voltage peaks. In order to decrease the voltage peaks, on the battery side, a resistor is connected between the DC converter and ground, by a switch.

SUMMARY

It is an object of the present invention, using simple and cost-effective means, to make possible the safe and rapid discharging of all capacitors in the DC voltage intermediate circuit, while simultaneously saving or reducing installation space.

An advantage of an example embodiment of the present invention is that, in the case of the methods according to the present invention and the associated devices for discharging all capacitors that are connected to the DC voltage intermediate circuit, the precharging resistor, that is already present, and that is normally in the battery, is used. Since the precharging resistor is already present, an additional discharge circuit is not needed or may be clearly reduced in the dimensioning.

An additional advantage is that the precharging resistor is usually dimensioned in such a way that a discharge is possible in a very short discharge time, usually clearly more rapidly than by using a separate discharge circuit.

Because of the possibility of a rapid intermediate circuit discharge, the endangerment of persons from high voltage is clearly reduced, for example, in the case of a crash. With the use of the example embodiment of the present invention, the discharge time is far less than with the use of conventional design approaches.

A further advantage of the example embodiment of the present invention is that it ensures the generally required very great vehicle availability. This means that, during the start of the hybrid vehicle, no time delays noticeable to the driver occur because of the charging of the intermediate circuit capacitors. Therefore, the precharging resistors should be dimensioned to be sufficiently big, so that a charging process of the intermediate circuit capacitors is normally completed in ca. 100 ms.

The requirements on the high voltage safety and the legal specifications, requiring rapid discharging of the intermediate circuit when the high-voltage network is switched off, not only in normal operation but also, especially, in the case of a crash, are advantageously satisfied. These discharge times of the intermediate circuit capacitors are shorter by a factor of 10 than those of the conventional design approaches.

The particular advantage of the example embodiment of the present invention is the simultaneous utilization of the precharging resistors for the charging and discharging process of the intermediate circuit. To achieve a discharge time of the same order of magnitude as is to be implemented using the precharging resistors, one would have to use an additional, separate resistor in the design approaches known from the related art, and therefore the design approach of the present invention has a competitive advantage at a simultaneous reduction in costs.

The main field of use for the design approaches, according to the present invention, are electric highway vehicles, hybrid vehicles and fuel cell vehicles that have a DC voltage intermediate circuit, and the energy stores present (intermediate circuit capacitors, Super-Caps) are charged via precharging resistors.

An additional field of use is batteries, special high voltage batteries for electric highway vehicles, hybrid vehicles and fuel cell vehicles, because the precharging resistors for the DC voltage intermediate circuit in electric highway vehicles, hybrid vehicles and fuel cell vehicles are normally located inside the high-voltage battery housing.

BRIEF DESCRIPTION OF THE DRAWINGS

The present invention is explained below with the aid of FIGS. 1 through 6.

DETAILED DESCRIPTION OF EXAMPLE EMBODIMENTS

Figure 4:
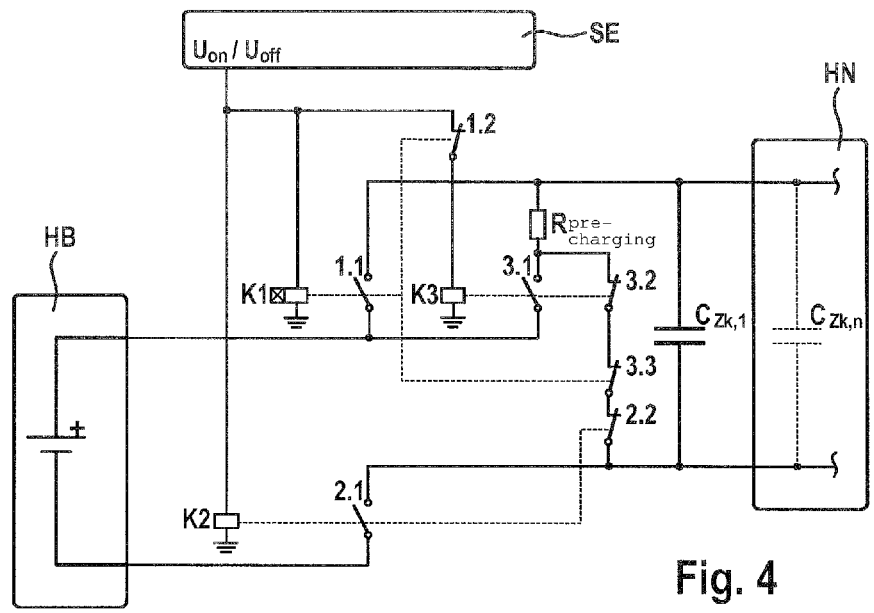
FIGS. 4 and 5 show a further possibility of intermediate circuit discharge via a precharging resistor in the plus branch or in the minus branch of the high-voltage battery.
Figure 5:
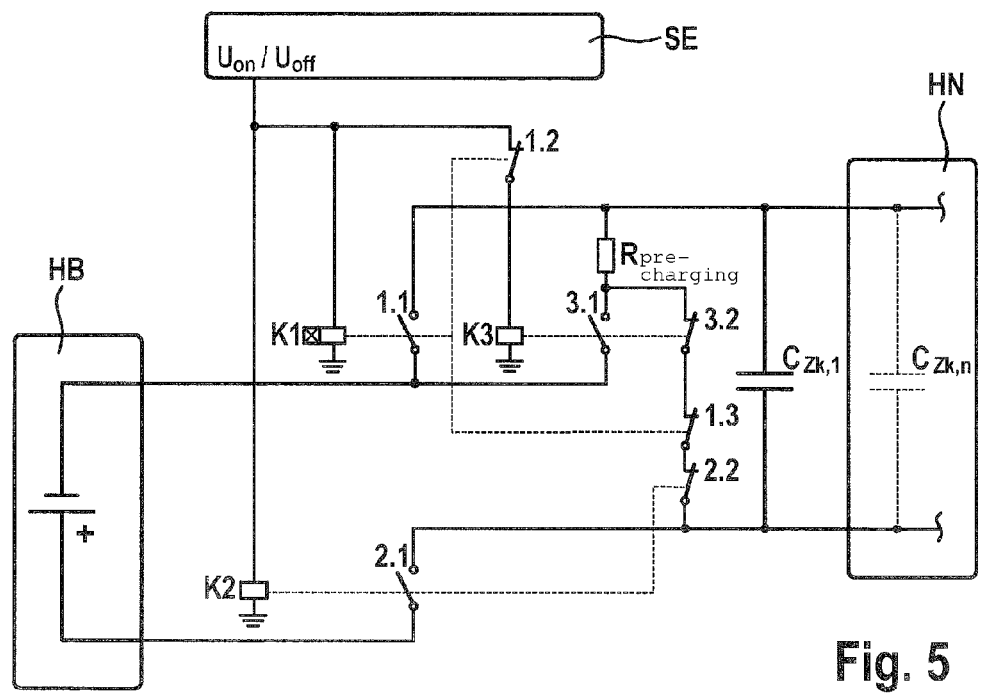

In the exemplary embodiments according to FIGS. 4 and 5, the following graphic symbols are used for the intermediate circuit discharge, but in the remaining exemplary embodiments, only make contact elements S1 to S4 of the switching devices are given.

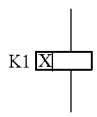

Switching device, for instance, main relay, main contactor having pickup delay; the pickup delay time usually corresponds to the time required for precharging all capacitors in the DC voltage intermediate circuit.

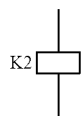

Switching device, e.g. main relay, main contactor.

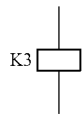

Switching device, e.g. precharging relay, precharging contactor.

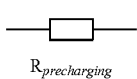

$R_{precharging}$

Precharging resistor; usual dimensioning $R_{precharging}$ 30-50Ω, 200W.

Break contact of a switching device (relay, contactor).

Make contact of a switching device (relay, contactor).

Chassis ground.

Figure 1:
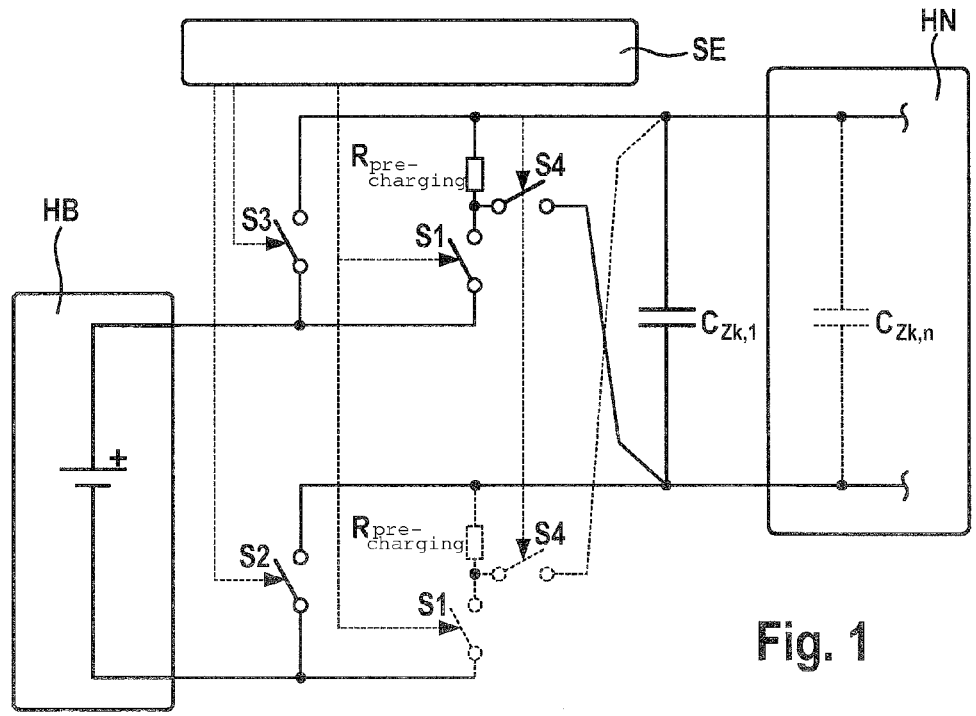
FIG. 1 shows the principle of the charging and discharging process.

FIG. 1 shows the principle of the charging and discharging process with the aid of a circuit and device according to an example embodiment of the present invention. The high-voltage network HN is able to be connected to the high-voltage battery HB via suitable lines. In the lines, various switching devices are situated, only the make contacts S1 to S4 being shown. The control of the switching devices and the operation of make contacts S1 to S4 take place using a control unit SE The capacitors in the DC voltage intermediate circuit of the high-voltage network are denoted as $C_{Zk,1}$ to $C_{Zk,n}$. One or more precharging resistors $R_{precharging}$ are able to be connected by suitable control of the contactors via make contacts S1 to S4 with specifiable terminals of high-voltage battery HB, one or more precharging resistors $R_{precharging}$ being able to be switched in; the arrangement of the precharging resistor(s) $R_{precharging}$ taking place so that the method for discharging the high-voltage network is able to take place.

In the simplest case, the capacitors in the DC voltage intermediate circuit of the high-voltage network are charged via one or several precharging resistors $R_{precharging}$. For the charging process, precharging contactors are used that have a simple make contact S1. There are three variants for the DC voltage intermediate circuit. The precharging contactor including precharging resistor, in this instance, is located as shown in FIG. 1, either in the plus branch or in the minus branch, it being also possible that one precharging resistor is in the plus branch and one in the minus branch.

Discharging contactors are used for the discharging process, which also have a simple make contact or switch S4. In the design approach of the present invention, for the discharging of all capacitors that are connected to the DC voltage intermediate circuit, the latter is short circuited and thereby discharged via the present precharging resistors $R_{precharging}$ and via make contacts S4 of the discharging connectors. In this context, the discharging takes place differently depending on the type of variant. The control for the charging and discharging process is assumed by control unit SE.

Figure 2:
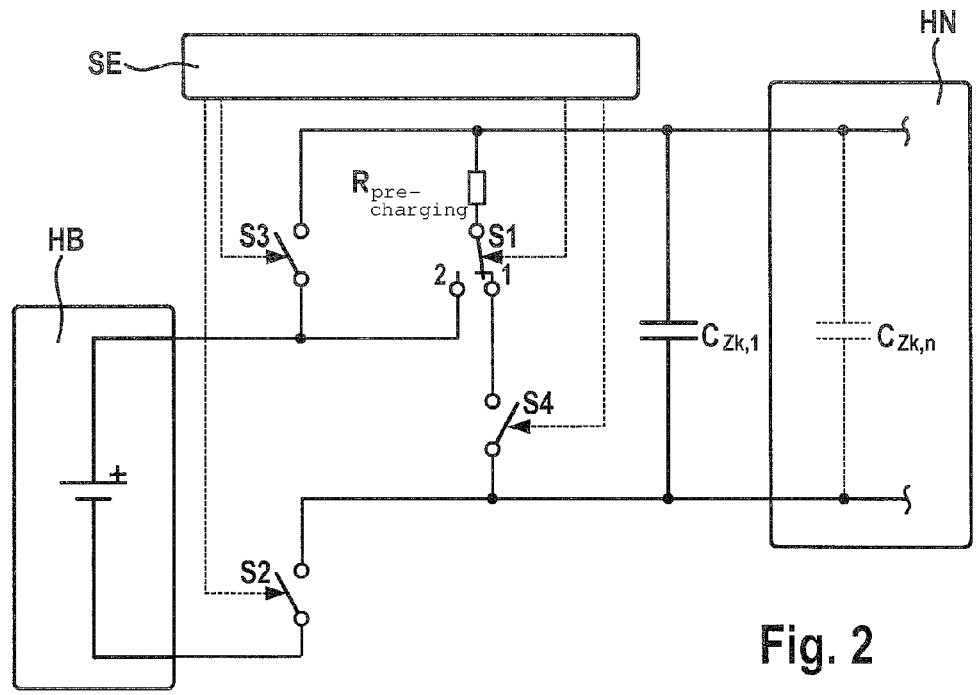
FIG. 2 shows how the intermediate circuit discharge takes place via a precharging resistor in the plus branch of the high-voltage battery.

Additional exemplary embodiments: An embodiment variant 1 is shown in FIG. 2. The intermediate circuit discharge, in this instance, takes place via a precharging resistor $R_{precharging}$ in the plus branch of the high-voltage battery. The capacitors in DC voltage intermediate circuit $C_{Zk,1}$ to $C_{Zk,n}$ of high-voltage network HN are then charged or discharged, in the simplest case, via a change-over switch S1. An additional auxiliary switch 84 is used for the discharge. The control for the charging and discharging process is assumed by control unit SE.

Charging process: Capacitors $C_{Zk,1}$ to $C_{Zk,n}$ in the DC voltage intermediate circuit of high-voltage network HN are charged via change-over switch S1 in switch position 2 when, in addition, main switch S2 is closed. After the capacitors have been charged in DC voltage intermediate circuit $C_{Zk,1}$ to $C_{Zk,n}$, main switch S3 is closed and the precharging resistor is bridged. The high-voltage network is now ready for operation, and no current I flows via the precharging resistor, i.e., the power loss in the precharging resistor $P_v = I^2 * R_{precharging}$ is zero.

Discharge process: After the opening of main switches S2 and S3, capacitors $C_{Zk,1}$ to $C_{Zk,n}$ in DC voltage intermediate circuit are discharged via change-over switch S1 in switch position 1 if, in addition, auxiliary switch S4 is closed. Auxiliary switch S4 is supposed to prevent the danger of a short circuit during switching, or rather is used to specifically control the discharging capacitors $C_{Zk,1}$ to $C_{Zk,n}$ in the DC voltage intermediate circuit, when this becomes necessary. For instance, in emergency operation, when, after load shedding of the high-voltage battery, the high-voltage users in the high-voltage network are to continue to be supplied via the electrical drive, it is not meaningful and not required to carry out the discharge of the DC voltage intermediate circuit.

Figure 3:
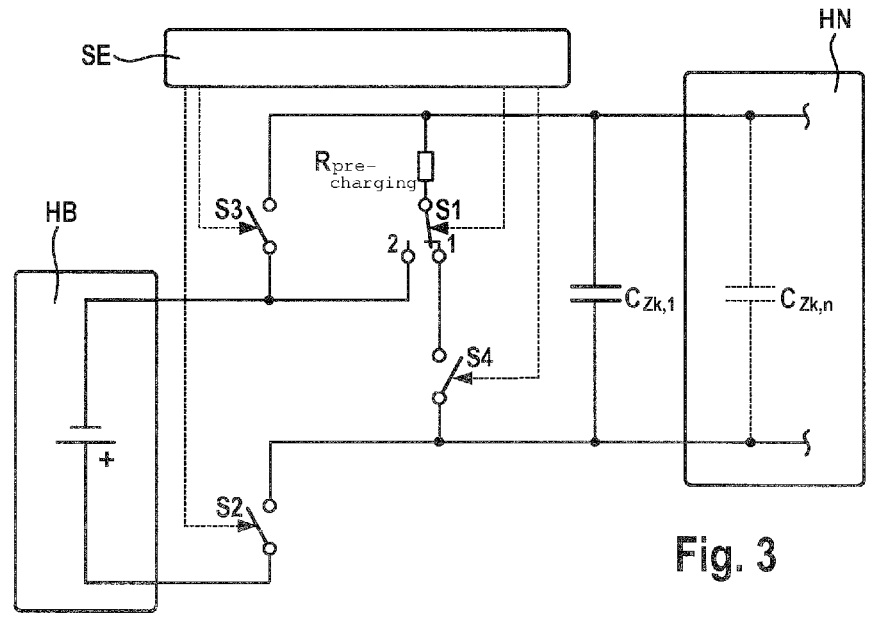
FIG. 3 shows the possibility of an intermediate circuit discharge via a precharging resistor in the minus branch of the high-voltage battery.

Instead of the intermediate circuit discharge via a precharging resistor $R_{precharging}$ in the plus branch, the intermediate circuit discharge is also able to take place via a precharging resistor $R_{precharging}$ in the minus branch. FIG. 3 shows a circuit for intermediate circuit discharge via a precharging resistor in the minus branch of the high-voltage battery.

An embodiment variant 2 is shown in FIGS. 4 and 5. The high-voltage network, in this case, is switched on and off in a controlled manner via control unit SE. In the intermediate circuit discharge in the circuit shown in FIG. 4, the discharge takes place via a precharging resistor in the plus branch of high-voltage battery HB, and FIG. 5 shows a circuit for the intermediate circuit discharge via a precharging resistor in the minus branch of high-voltage battery HB.

Charging process: Contactors K2 and K3 are activated by actuation signal $U_{ON}$ of control unit SE, that is, make contacts 2.1 and 3.1 of contactors K2 and K3 are closed, while break contacts 2.2 and 3.2 are correspondingly opened. Contactor K1 is activated via actuation signal $U_{ON}$ of the control unit, but switches on only after the expiration of the pickup delay time. The capacitors in DC voltage intermediate circuit $C_{Zk,1}$ to $C_{Zk,n}$ are charged via precharging resistor $R_{precharging}$. After the expiration of the pickup delay time, make contact 1.1 of contactor K1 closes, while break contacts 1.2 and 1.3 of K1 open correspondingly. The opening of break contact 1.2 results in deactivating contactor K3. Precharging resistor $R_{precharging}$ is bridged by make contact 1.1 of contactor K1. The high-voltage network is now ready for operation, and no current I flows via precharging resistor $R_{precharging}$, i.e. the power loss $P_v = I^2 * R_{precharging}$ in precharging resistor $R_{precharging}$ is zero.

Discharge process: Contactors K1, K2 and K3 are deactivated by switch-off signal $U_{OFF}$ of the control unit. Because of break contacts 1.3, 2.2 and 3.2, the circuit for discharging the capacitors in DC voltage intermediate circuit $C_{Zk,1}$ to $C_{Zk,n}$ via precharging resistor $R_{precharging}$ is short circuited. The capacitors in DC voltage intermediate circuit $C_{Zk,1}$ to $C_{Zk,n}$ are discharged via precharging resistor $R_{precharging}$.

Break contacts 1.3, 2.2 and 3.2 are used for system safety, so that, in case of fault functions of the contactors, as well as in response to load shedding of the high-voltage battery and corresponding emergency functions, such as maintaining the high-voltage network for additional high-voltage users, the discharge is prevented.

The exemplary embodiments describe the general case. The precharging resistor is able to, but does not necessarily have to be situated in the battery, or is a component of the battery. The same applies to the electrical switch used and the contactors. The energy stores and the high-voltage batteries in the high-voltage network are charged via the precharging resistor(s). One may take as being quite general, in this instance, that an electrical contact switch closes the circuit in such a way that the precharging resistor lies in parallel to the intermediate circuit capacitor.

Figure 6:
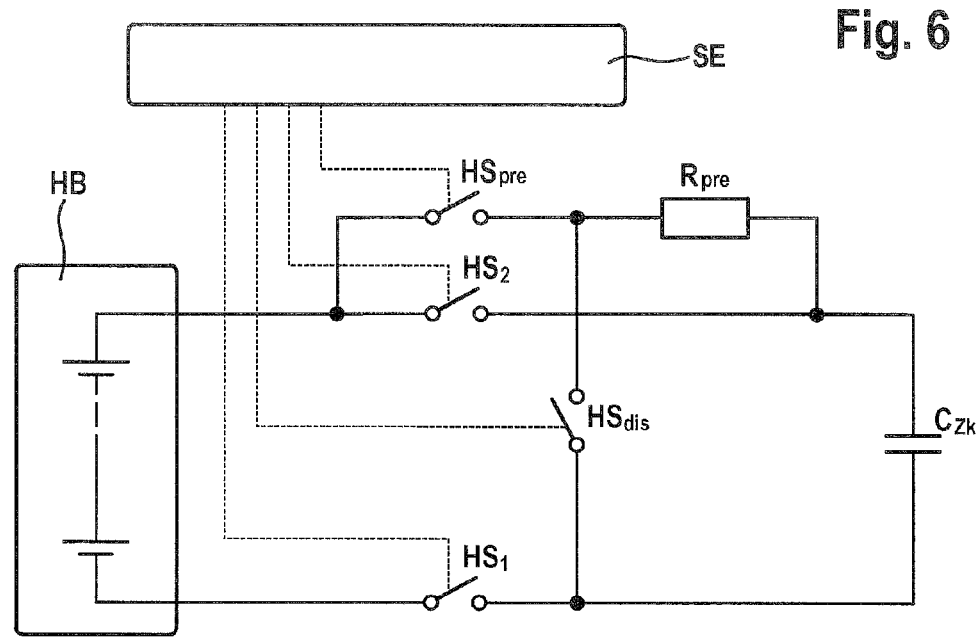
FIG. 6 shows an additional variant of the embodiment according to the present invention.

FIG. 6 shows an additional embodiment variant not having its own high-voltage network. High-voltage battery HB is connectable in this case to precharging resistor $R_{precharging}$ via precharging contactor $HS_{pre}$, and via main contactor $HS_2$ a connection may be produced between the high-voltage HB and the connecting point between precharging resistor $R_{precharging}$ and capacitor $C_{Zk}$. Additional main contactors $HS_1$ and HS make possible a connection for the minus pole of high-voltage battery HB and for precharging resistor $R_{precharging}$.

Precharging resistor $R_{precharging}$ and/or the precharging resistors and/or the switches and contactors as well as possibly also control unit SE may be, but do not have to be components of high-voltage battery HB and, for instance, also lie within the battery housing. The energy store(s) in the high-voltage network are charged via the precharging resistor(s) and are also able to be quickly discharged via the same precharging resistor(s). The general case is that an electrical contact switch closes the circuit in such a way that the precharging resistor lies parallel to the intermediate circuit capacitor.

When the example method or example devices according to the present invention are used in an electric highway vehicle, a hybrid vehicle or a fuel cell vehicle, one should take care that the generally required very great vehicle availability is to be ensured. This means that, during the start of the hybrid vehicle, no time delays noticeable to the driver may occur because of the charging of the intermediate circuit capacitors. Therefore, the precharging resistors should be dimensioned to be sufficiently big, so that a charging process of the intermediate circuit capacitors is normally completed in ca. 100 ms. However, this also makes possible a rapid discharge of the intermediate circuit capacitors via the precharging resistors.

The requirements on the high voltage safety and the legal specifications, requiring rapid discharging of the intermediate circuit when the high-voltage network is switched off, not only in normal operation but also, especially, in the case of a crash, are advantageously satisfied. These rapid discharge times of the intermediate circuit capacitors via the precharging resistors, that are to be dimensioned sufficiently large, are shorter by a factor of 10 than those of the conventional design approaches, which make possible discharge times of one second.

What is claimed is:

1. A method for charging and discharging a high-voltage network including a DC voltage intermediate circuit, which is connectable to an energy source via at least one resistor, the method comprising:
    performing one of a charging or precharging process using the at least one resistor as an in-common resistor;
    after a delay pickup time of the charging or precharging process, bypassing the in-common resistor during operation of the high-voltage network; and
    performing the discharging process of intermediate circuit capacitors of the DC voltage intermediate circuit using the in-common resistor,
    wherein the charging or precharging process and the discharging process pass current through the in-common resistor in respectively opposite current directions.

2. The method as recited claim 1, wherein, for the charging and precharging process, the resistor is connected serially to the capacitors of the DC voltage intermediate circuit, and for the discharging process the resistor is not connected serially to the capacitors but is connected in parallel using a switching device.

3. The method as recited in claim 1, wherein the at least one resistor is connected to specifiable sides of the energy source via a switching device that is controllable by a control unit, whereby the charging and precharging process or the discharging process is carried out by the same resistor, depending on the switching state of the switching device.

4. The method as recited in claim 2, wherein the energy source is one of a battery, a high-voltage battery, a battery having a postconnected DC/DC converter, or a fuel cell.

5. The method as recited in claim 1, wherein the DC voltage intermediate circuit is in one of a hybrid vehicle, an electric highway vehicle, or a fuel cell vehicle.

6. The method as recited in claim 1, wherein, in normal operation, the discharge takes place as required or when a crash is detected.

7. A device for charging and discharging a DC voltage intermediate circuit, comprising:
   an arrangement which is connectable to an energy source via at least one resistor, wherein
   the at least one resistor is used both for i) a charging or precharging process, and ii) a discharging process of intermediate circuit capacitors of the DC voltage intermediate circuit,
   after a delay pickup time of the charging or precharging process, the in-common resistor is by-passed, and
   the charging or precharging process and the discharging process pass current through the at least one resistor in respectively opposite current directions.

8. The device as recited in claim 7, wherein the at least one resistor lies in a plus branch or in a minus branch and is connectable to a plus or a minus side of the energy source.

9. The device as recited in claim 7, wherein the at least one resistor includes a first resistor connected via at least one first switch to a first terminal of the energy source and a second resistor connected via at least one second switch to a second terminal of the energy source.

10. The device as recited in claim 7, wherein the energy source is one of a battery, a high-voltage battery, a battery having a postconnected DC/DC converter or a fuel cell.

11. The device as recited in claim 7, wherein the at least one resistor is dimensioned so that a voltage of the DC voltage intermediate circuit is reduced in less than one second to non-dangerous voltage values.

12. The device as recited in claim 7, wherein the at least one resistor is dimensioned so that a voltage of the DC voltage intermediate circuit is reduced within 0.1 seconds to non-dangerous voltage values.

13. The device as recited in claim 10, wherein the at least one resistor is a component of the energy source, the energy source being a high-voltage battery, and the at least one resistor is situated on an inside of a housing of the battery.

14. The device as recited in claim 7, wherein the at least one resistor is situated at a location between the energy source and the DC voltage intermediate circuit.

15. The device as recited in claim 9, wherein the first resistor is connected via at least one third switch to a first terminal of the intermediate circuit capacitors and the second resistor is connected via at least one fourth switch to a second terminal of the intermediate circuit capacitors.

16. The device as recited in claim 7, wherein the discharging process includes connecting the intermediate circuit capacitors in a discharge path by closing at least two switching elements of the arrangement after the charging or precharging process is complete.

17. The method as recited in claim 1, wherein the at least one resistor includes a first resistor connected via at least one first switch to a first terminal of the energy source and a second resistor connected via at least one second switch to a second terminal of the energy source.

18. The method as recited in claim 17, wherein the first resistor is connected via at least one third switch to a first terminal of the intermediate circuit capacitors and the second resistor is connected via at least one fourth switch to a second terminal of the intermediate circuit capacitors.

19. The method as recited in claim 1, wherein the discharging process includes connecting the intermediate circuit capacitors in a discharge path by closing at least two switching elements after the charging or precharging process is complete.

20. A device for charging and discharging a DC voltage intermediate circuit, comprising:
   at least one resistor;
   at least one first switching element to connect an energy source to a capacitor of the DC voltage intermediate circuit via the at least one resistor to charge or precharge the capacitor; and
   at least one second switching element to connect the capacitor in a discharging path via the at least one resistor to discharge the capacitor,
   wherein the at least one first and second switching elements are arranged so that the charging or precharging and the discharging pass current through the at least one resistor in respectively opposite current directions.

21. The device as recited in claim 20, wherein the at least one resistor includes first and second resistors connected via the at least one switching element respectively to first and second terminals of the energy source.

22. The device as recited in claim 21, wherein the first and second resistors are connected via the at least one second switching element respectively to first and second terminals of the intermediate circuit capacitors.

23. The device as recited in claim 20, wherein the discharging includes connecting the capacitor in a discharge path by closing at least two switches of the at least one second switching element after the charging or precharging is completed.

* * * * *

UNITED STATES PATENT AND TRADEMARK OFFICE
CERTIFICATE OF CORRECTION

PATENT NO.       : 8,729,864 B2
APPLICATION NO. : 12/681328
DATED            : May 20, 2014
INVENTOR(S)      : Dittmer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Twenty-ninth Day of September, 2015

Michelle K. Lee
*Director of the United States Patent and Trademark Office*